United States Patent
Wu

(10) Patent No.: US 10,647,343 B2
(45) Date of Patent: May 12, 2020

(54) SHOPPING CART, PROMPTING METHOD, AND ELECTRONIC DEVICE FOR SHOPPING CART

(71) Applicant: BEIJING XIAOMI MOBILE SOFTWARE CO., LTD., Beijing (CN)

(72) Inventor: Ke Wu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/114,645

(22) Filed: Aug. 28, 2018

(65) Prior Publication Data

US 2019/0106138 A1   Apr. 11, 2019

(30) Foreign Application Priority Data

Oct. 10, 2017   (CN) .......................... 2017 1 0936952

(51) Int. Cl.
*B62B 3/14*   (2006.01)
*G06Q 30/06*   (2012.01)
(Continued)

(52) U.S. Cl.
CPC .......... *B62B 3/1424* (2013.01); *B62B 3/1412* (2013.01); *B62B 5/0096* (2013.01);
(Continued)

(58) Field of Classification Search
CPC ... B62B 3/1424; B62B 3/1412; B62B 5/0096; G06K 7/10405; G06K 7/10425
(Continued)

(56) References Cited

U.S. PATENT DOCUMENTS 5,250,789 A * 10/1993 Johnsen .................. B62B 3/142
                                                           235/383
5,729,697 A *  3/1998 Schkolnick .......... G06Q 20/203
                                                           235/383
(Continued)

FOREIGN PATENT DOCUMENTS

CN   203149739 U   8/2013
CN   106800033 A   6/2017
(Continued)

OTHER PUBLICATIONS

Extended European Search Report dated Mar. 6, 2019 in Patent Application No. 18199670.3, 8 pages.
(Continued)

*Primary Examiner* — Paultep Savusdiphol
(74) *Attorney, Agent, or Firm* — Oblon, McClelland, Maier & Neustadt, L.L.P.

(57) ABSTRACT

The application discloses a shopping cart, an electronic device, and a method. The shopping cart can include a first acquisition apparatus configured to obtain user preference information associated with a user of the shopping cart. The shopping cart can further include a second acquisition apparatus configured to acquire product information of a commercial product and processing circuitry configured to determine whether the product information matches the user preference information. When the product information fails to match the user preference information, the processing circuitry performs a prompting operation corresponding to the commercial product to prompt the user that the product information fails to match the user preference information. The shopping cart can include a mechanical frame that includes a storage area.

18 Claims, 7 Drawing Sheets

(51) Int. Cl.
　　　*B62B 5/00* (2006.01)
　　　*G06K 7/10* (2006.01)
(52) U.S. Cl.
　　　CPC ..... *G06K 7/10405* (2013.01); *G06K 7/10425* (2013.01); *G06Q 30/0641* (2013.01)
(58) Field of Classification Search
　　　USPC .................................. 235/383, 375, 385
　　　See application file for complete search history.

(56) References Cited

U.S. PATENT DOCUMENTS

| | | | | |
|---|---|---|---|---|
| 7,617,132 | B2* | 11/2009 | Reade | G06Q 20/208 705/26.61 |
| 8,474,711 | B2* | 7/2013 | Ulrich | G06Q 30/0603 235/380 |
| 2004/0103043 | A1* | 5/2004 | Reade | G06Q 20/208 705/23 |
| 2004/0111320 | A1 | 6/2004 | Schlieffers et al. | |
| 2006/0237523 | A1* | 10/2006 | Carlson | G06F 19/3475 235/375 |
| 2006/0283943 | A1* | 12/2006 | Ostrowski | A47F 9/045 235/383 |
| 2006/0289637 | A1* | 12/2006 | Brice | G06Q 10/087 235/385 |
| 2008/0230603 | A1* | 9/2008 | Stawar | B62B 3/1408 235/383 |
| 2008/0237339 | A1* | 10/2008 | Stawar | B62B 3/1408 235/383 |
| 2008/0308630 | A1* | 12/2008 | Bhogal | G06Q 30/02 235/383 |
| 2010/0280918 | A1* | 11/2010 | Balent | G06Q 30/0633 705/26.81 |
| 2013/0282522 | A1* | 10/2013 | Hassan | G06Q 10/087 705/26.9 |
| 2015/0363798 | A1 | 12/2015 | Aihara et al. | |
| 2016/0364785 | A1* | 12/2016 | Wankhede | G06Q 30/0633 |
| 2016/0364786 | A1* | 12/2016 | Wankhede | G06Q 30/0633 |

FOREIGN PATENT DOCUMENTS

| | | |
|---|---|---|
| CN | 107010095 A | 8/2017 |
| CN | 107705180 A | 2/2018 |
| EP | 1 873 707 A1 | 1/2008 |
| JP | 2016004353 | 1/2016 |
| RU | 104138 U1 | 5/2011 |

OTHER PUBLICATIONS

International Search Report dated Jul. 17, 2018 in PCT/CN2018/084997, 3 pages.

Written Opinion of the International Search Authority, dated Jul. 17, 2018 in PCT/CN2018/084997, 4 pages.

Superlsy, "Smart Shopping Cart/Basket Planning" Baidu Library, Search from the Internet: URL:https://wenku.baidu.com/view/fcdb6ebd6294dd88d0d26b5a.html, Jun. 25, 2018, 3 pages (with English translation).

Opening The Book Ltd: "Pushing the book cart—(library book trolleys or book carts in the US)", Retrieved from the Internet: URL: https://web.archive.org/web/20170306193333/http://www.openingthebook.com:80/blog/pushing-the-book-cart, XP055559791, Mar. 6, 2017, pp. 1-15.

Combined Chinese Office Action and Search Report dated Jun. 13, 2019 in Chinese Patent Application No. 201710936952.8 (with English translation), 21 pages.

Zhou, J., et al., "A Supermarket Intelligent Shopping Guide System Based on ZigBee Positioning Network", Intelligent City, May 25, 2017, pp. 48-52 (with English abstract).

First Office Action dated Oct. 30, 2019 in Russian Application No. 2019104818 (with English translation), citing document AO therein, 14 pages.

Second Office Action dated Dec. 2. 2019 in Chinese Application No. 201710936952.8 (with English Translation), citing document AP therein, 25 pages.

Office Action dated Feb. 26, 2020 in Japanese Application No. 2018-568382 with English translation, 8 pages.

* cited by examiner

SHOPPING CART, PROMPTING METHOD, AND ELECTRONIC DEVICE FOR SHOPPING CART

CROSS-REFERENCE TO RELATED APPLICATIONS

This application is based upon and claims priority to Chinese Patent Application No. 201710936952.8, filed on Oct. 10, 2017, the entire contents of which are incorporated herein by reference.

TECHNICAL FIELD

The present disclosure generally relates to the technical field of intelligent equipment.

BACKGROUND

A shopping cart is a common auxiliary shopping tool in various self-service stores such as a supermarket, and customers may temporarily store selected commodities in shopping carts. Shopping carts usually have multiple layers capable of storing different articles, and some may also carry kids.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

According to aspects of the present disclosure, a shopping cart is provided. The shopping cart includes a first and a second acquisition apparatus, processing circuitry, and a mechanical frame. The first acquisition apparatus is configured to obtain user preference information associated with a user of the shopping cart. The second acquisition apparatus is configured to acquire product information of a commercial product. The processing circuitry is configured to determine whether the product information matches the user preference information. When the product information fails to match the user preference information, the processing circuitry is configured to perform a prompting operation corresponding to the commercial product to prompt the user that the product information fails to match the user preference information. The mechanical frame includes a storage area.

In some embodiments, the first acquisition apparatus, the second acquisition apparatus, and the processing circuitry are attached to the mechanical frame. The processing circuitry is configured to obtain the user preference information and the product information from the first acquisition apparatus and the second acquisition apparatus, respectively.

In some examples, the second acquisition apparatus comprises at least one of: a scanning device, a receiver, and a camera device. The scanning device is configured to scan a barcode of the commercial product to obtain the product information. The receiver is configured to receive the product information transmitted from a shelf storing the commercial product. The camera device is configured to sample a tag of the commercial product to obtain a sampled picture, and analyze the sampled picture to obtain the product information.

In some examples, the processing circuitry is configured to perform the prompting operation corresponding to the commercial product when the commercial product fails to match the user preference information by at least one of: controlling a light source attached to the mechanical frame to produce light flashes, controlling an audio equipment attached to the mechanical frame to output an audio warning message, displaying a warning message on a display panel attached to the mechanical frame, and sending an indication message to a terminal device used by the user.

In some examples, the product information fails to match the user preference information and the commercial product is located in the storage area of the mechanical frame. The processing circuitry is configured to control a mechanical arm attached to the mechanical frame to move the commercial product out of the storage area or send a command to a shelf, instructing the shelf to move the commercial product out of the storage area using a mechanical arm attached to the shelf.

In an example, the first acquisition apparatus comprises a receiver configured to receive, from a terminal device of the user, the user preference information. In an example, the first acquisition apparatus is further configured to acquire historical shopping data associated with the user, and determine the user preference information according to the historical shopping data.

In some embodiments, the user preference information includes whether or not to have a particular: food ingredient, food flavor, drug ingredient, and fabric content. In some embodiments, the user preference information includes a remaining shelf life.

In some embodiments, the product information comprises at least one of: a parameter indicating a remaining shelf life, one or more food ingredients, one or more food flavors, one or more drug ingredients, and one or more fabric contents.

According to aspects of the present disclosure, a method is provided. The method comprises obtaining, by an electronic device, user preference information associated with a user of the electronic device. The method comprises acquiring product information of a commercial product. The method comprises determining whether the product information matches the user preference information. When the product information fails to match the user preference information, the method includes performing a prompting operation corresponding to the commercial product to prompt the user that the product information fails to match the user preference information.

According to aspects of the present disclosure, an electronic device is provided. The electronic device includes a first acquisition apparatus, a second acquisition apparatus, and processing circuitry. The first acquisition apparatus is configured to obtain user preference information associated with a user of the electronic device. The second acquisition apparatus is configured to acquire product information of a commercial product. The processing circuitry is configured to determine whether the product information matches the user preference information, and perform a prompting operation corresponding to the commercial product to prompt the user that the commercial product fails to match the user preference information when the product information fails to match the user preference information.

It should be understood that the above general descriptions and detailed descriptions below are only exemplary and explanatory and not intended to limit the present disclosure.

BRIEF DESCRIPTION OF THE DRAWINGS

The accompanying drawings herein are incorporated in and become parts of the specification, illustrate embodiments consistent with the disclosure and, together with the description, serve to explain the principles of the disclosure.

Figure 1:
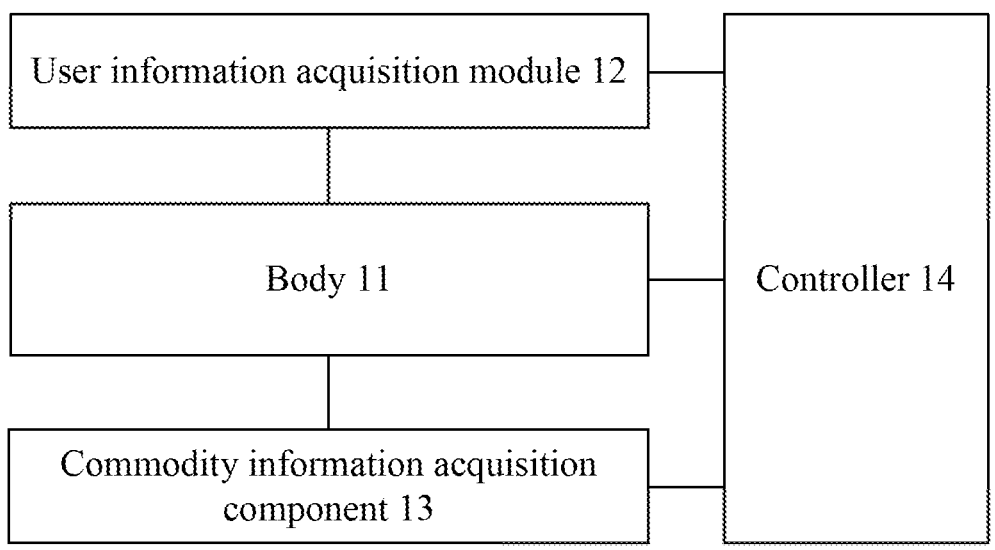
FIG. 1 is a block diagram of a shopping cart according to an embodiment of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Descriptions will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

In the related technology, when shopping in a shopping mall or a supermarket, a customer may use a shopping cart to temporarily store selected commodities. In practice, a user may have some preferences to commodities when shopping. For example, there is made a requirement on a food shelf life, for example, shopping requirements that a left shelf life (or a remaining shelf life) of milk is a week, a left shelf life of bread is 3 days and a left shelf life of independent pouch food is more than 6 months. For another example, there is made a requirement on a food taste (or a food flavor), for example, some users do not like spicy food or do not like bitter food. For another example, there is made a requirement on commodity compositions, for example, food containing some compositions (or ingredients) are inedible for pregnant users, users with allergic histories cannot buy food or personal items containing allergic compositions, users recently taking some medicaments cannot buy food containing compositions conflicting with the medicaments, diabetic patients have requirements on sugar intake. However, for discriminating information of shelf lives and/or compositions of commodities, users manually check tags of commodities to be selected one by one, checking processes are troublesome, labor-consuming and quite inconvenient particularly for parents with children, and it is also difficult for the aged with poor eyesight, so that user experiences are poorer.

For solving the problem, an embodiment of the present disclosure provides a shopping cart, which includes: a body (or a mechanical frame) including a storage area; a user information acquisition component (or a first acquisition apparatus), connected with (or attached to) the body and configured to acquire commodity preference information (or user preference information) of a user; a commodity information acquisition component (or a second acquisition apparatus), connected with the body and configured to acquire key information (product information) of a commodity (or a commercial product); and a controller (or processing circuitry), connected with the body, the user information acquisition component and the commodity information acquisition component respectively and configured to, when the key information of the commodity is mismatched with (or fails to match) the commodity preference information, perform a prompting operation corresponding to the commodity, wherein the prompting operation is configured to prompt the user that the commodity is inconsistent with (or fails to match) commodity preference indicated by the commodity preference information. According to the embodiment of the present disclosure, the key information of the commodity is analyzed, and when the key information of the commodity is mismatched with the commodity preference information, the user may be automatically prompted that the commodity is inconsistent with commodity preference indicated by the commodity preference information, and the user is not required to manually check the tag of the commodity, so that intelligence in checking of commodity information is achieved, the user may conveniently select the commodity, and a user experience is improved.

FIG. 1 is a block diagram of a shopping cart, according to an exemplary embodiment. As shown in FIG. 1, the shopping cart includes: a body 11 configured to store a commodity, for example, in a storage area of the body 11, a user information acquisition component 12, a commodity information acquisition component 13 and a controller 14, wherein the user information acquisition component 12 is connected with the body 11, and is configured to acquire commodity preference information of a user;

the commodity information acquisition component 13 is connected with the body 11, and is configured to acquire key information of the commodity; and the controller 14 is connected with the body 11, the user information acquisition component 12 and the commodity information acquisition component 13 respectively, and is configured to, when the key information of the commodity is mismatched with the commodity preference information, perform a prompting operation corresponding to the commodity, wherein the prompting operation is configured to prompt the user that the commodity is inconsistent with commodity preference indicated by the commodity preference information. In an example, the controller receives the commodity preference information and the key information of the commodity from the user information acquisition component 12 and the commodity information acquisition component 13, respectively. In some embodiments, the commodity preference information of the user includes whether or not to have a particular: food ingredient, food flavor, drug ingredient, and fabric content. Exemplarily, the commodity preference information of the user includes any one or combination of the following parameters: a remaining shelf life preference for a commodity, a food taste (or a food flavor) preference, a food composition (ingredient) preference and a clothing composition (a fabric content) preference. For example, the user has a requirement on a shelf life of food, for example, a left shelf life of milk is a week, a left shelf life of bread is 3 days and a left shelf life of independent pouch food is more than 6 months. For another example, there is made a requirement on a food taste, for example, some users do not like spicy food or do not like bitter food. For another example, there is made a requirement on commodity compositions, for example, food containing some compositions are inedible for pregnant users, users with allergic histories cannot buy food or personal items containing allergic compositions, users recently taking some medicaments cannot buy food containing compositions conflicting with the medicaments, diabetic patients have requirements on sugar intake.

Exemplarily, the user information acquisition component 12 may include: a user information receiver (or a receiver) and/or a determination module, wherein the user information receiver is configured to receive the commodity preference information of the user from a terminal (or a terminal device) of the user; and the determination module is configured to acquire historical shopping data of the user and determine the commodity preference information of the user according to the historical shopping data of the user.

Exemplarily, the user information acquisition module 12 may acquire the commodity preference information of the user in advance; when the user checks the commodity in a hand, or, when the user gets close to the commodity, or, when the user places the commodity in the shopping cart, the commodity information acquisition component 13 acquires the key information of the commodity, and then the controller 14 judges whether the key information of the commodity is matched with the commodity preference information or not; when the key information of the commodity is matched with the commodity preference information, the flow is ended; and when the key information of the commodity is mismatched with the commodity preference information, the controller 14 performs any one or combination of the following prompting operations corresponding to the commodity:

a) controlling a light source such as an alarm lamp fixed on the shopping cart (such as the mechanical frame) to flicker (or to produce light flashes) for alarming b) controlling audio play equipment (or an audio equipment) fixed on the shopping cart (such as the mechanical frame) to output a voice prompt (or an audio warning message);

c) outputting (or displaying) a prompting message (or a warning message) on a display panel of the shopping cart, the prompting message being configured to prompt the user that the commodity is inconsistent with commodity preference indicated by the commodity preference information;

d) sending an indication message to the terminal of the user, the indication message being configured to prompt the user that the commodity is inconsistent with commodity preference indicated by the commodity preference information;

e) controlling a mechanical arm of the shopping cart to move the commodity out of the shopping cart, such as the storage area of the shopping cart;

f) sending a moving-out command to a goods shelf (or a shelf), the moving-out command being configured to indicate the goods shelf to move the commodity out of the shopping cart, such as the storage area of the shopping cart, using a mechanical arm of the goods shelf. In an example, the goods shelf stores the commodity.

In an example, the display panel is attached to the mechanical frame of the shopping cart. In an example, the mechanical arm of the shopping cart is attached to the mechanical frame.

Exemplarily, the commodity information acquisition component 13 may include any one or combination of the following parts: a scanner (or a scanning device), a receiver or a camera (or a camera device), wherein the scanner is configured to scan a barcode of the commodity to obtain the key information of the commodity; the receiver is configured to receive the key information of the commodity from the goods shelf; and the camera is configured to sample a tag of the commodity to obtain a sampled picture and analyze the sampled picture to obtain the key information of the commodity. In an example, the receiver is configured to receive the key information of the commodity transmitted from the goods shelf In an example, the goods shelf stores the commodity.

According to the technical solution provided by the embodiment of the present disclosure, the key information of the commodity is analyzed, and when the key information of the commodity is mismatched with the commodity preference information, the user may be automatically prompted that the commodity is inconsistent with commodity preference indicated by the commodity preference information, and the user not required to manually check the tag of the commodity, so that intelligence in checking of commodity information is achieved, the user may conveniently select the commodity, and a user experience is improved.

On the basis of the equipment embodiment of the present disclosure, a method embodiment of the present disclosure will be introduced below.

Figure 2:
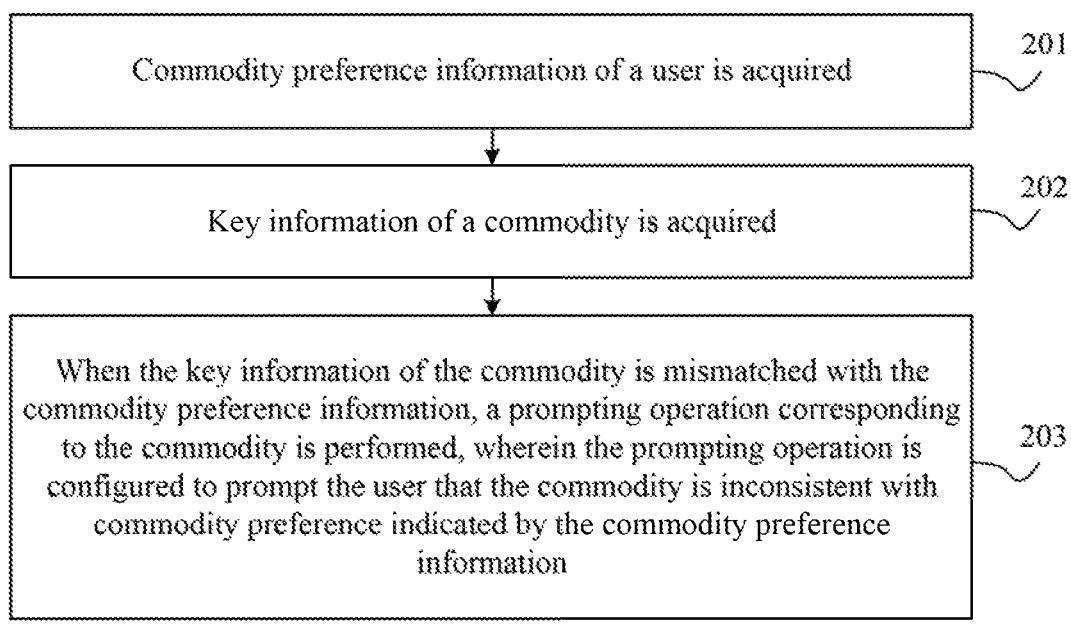
FIG. 2 is a flow chart showing a prompting method for shopping cart according to an embodiment of the disclosure.

FIG. 2 is a flow chart showing a prompting method for a shopping cart according to an exemplary embodiment. As shown in FIG. 2, the method includes the following steps 201-203.

In Step 201, commodity preference information of a user is acquired.

Exemplarily, the commodity preference information of the user includes any one or combination of the following parameters: a remaining shelf life preference for a commodity, a food taste preference, a food composition preference and a clothing composition preference. For example, the user has a requirement on a shelf life of food, for example, a left shelf life of milk is a week, a left shelf life of bread is 3 days and a left shelf life of independent pouch food is more than 6 months. For another example, there is made a requirement on a food taste, for example, some us do not like spicy food or do not like bitter food. For another example, there is made a requirement on commodity compositions, for example, food containing some compositions are inedible for pregnant users, users with allergic histories cannot buy food or personal items containing allergic compositions, users recently taking some medicaments cannot buy food containing compositions conflicting with the medicaments, diabetic patients have requirements on sugar intake.

Exemplarily, an implementation manner for acquiring the commodity preference information of the user include any one or combination of the following manners:

a first manner: receiving the commodity preference information of the user from a terminal of the user;

a second manner: acquiring historical shopping data of the user and determining the commodity preference information of the user according to the historical shopping data of the user; and a third manner: receiving health information of the user from the terminal of the user and determining the commodity preference information of the user according to the health information of the user.

In Step 202, key information of a commodity is acquired.

Exemplarily, an implementation manner for acquiring the key information of the commodity may include any one or combination of the following manners: manner 1): scanning a barcode of the commodity to obtain the key information of the commodity; manner 2): receiving the key information of the commodity from a goods shelf, and manner 3): invoking a camera of a shopping cart to sample a tag of the commodity to obtain a sampled picture and analyzing the sampled picture to obtain the key information of the commodity.

It is important to note that there is no sequence between execution processes of Step 201 and Step 202, Step 201 may be performed before Step 202, Step 201 may also be performed after Step 202, or Step 201 and Step 202 are performed at the same time, which will not be limited in the present disclosure.

In Step 203, when the key information of the commodity is mismatched with the commodity preference information, a prompting operation corresponding to the commodity is performed, wherein the prompting operation is configured to prompt the user that the commodity is inconsistent with commodity preference indicated by the commodity preference information.

Exemplarily, when the user checks the commodity in a hand, or, when the user gets close to the commodity, or, when the user places the commodity in the shopping cart, the key information of the commodity is acquired, and then whether the key information of the commodity is matched with the commodity preference information or not is judged, when the key information of the commodity is matched with the commodity preference information, the flow is ended; and when the key information of the commodity is mismatched with the commodity preference information, any one or combination of the following prompting operations corresponding to the commodity is performed:

a) controlling an alarm lamp fixed on the shopping cart to flicker for alarming;

b) controlling audio play equipment fixed on the shopping cart to output a voice prompt;

c) outputting a prompting message on a display panel of the shopping cart, the prompting message being configured to prompt the user that the commodity is inconsistent with commodity preference indicated by the commodity preference information;

d) sending an indication message to the terminal of the user, the indication message being configured to prompt the user that the commodity is inconsistent with commodity preference indicated by the commodity preference information;

e) controlling a mechanical arm of the shopping cart to move the commodity out of the shopping cart;

f) sending a moving-out command to the goods shelf, the moving-out command being configured to indicate the goods shelf to move the commodity out of the shopping cart using a mechanical arm of the goods shelf.

According to the technical solution provided by the embodiment of the present disclosure, the key information of the commodity is analyzed, and when the key information of the commodity is mismatched with the commodity preference information, the user may be automatically prompted that the commodity is inconsistent with commodity preference indicated by the commodity preference information, and the user is not required to manually check the tag of the commodity, so that intelligence in checking of commodity information is achieved, the user may conveniently select the commodity, and a user experience is improved.

Figure 3:
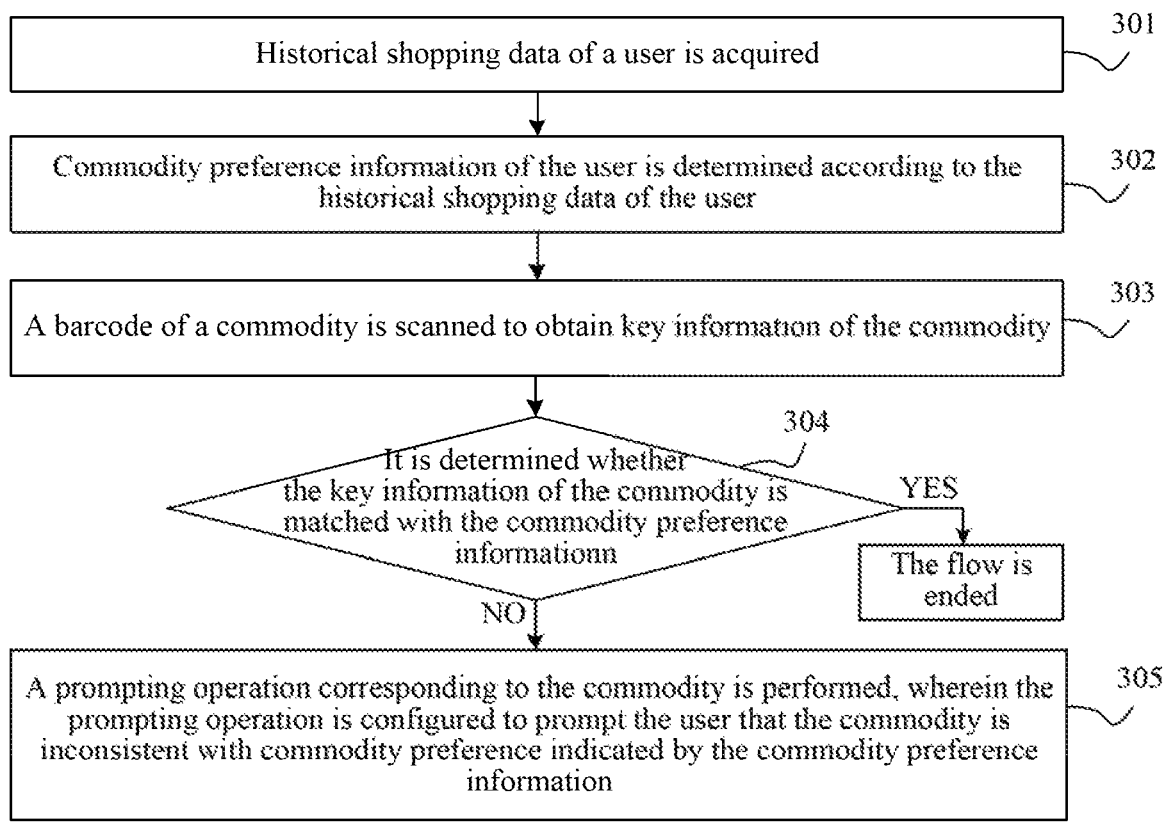
FIG. 3 is a flow chart showing a prompting method for a shopping cart according to an embodiment of the disclosure.

FIG. 3 is a flow chart showing a prompting method for a shopping cart according to an exemplary embodiment. As shown in FIG. 3, the method includes the following steps.

In Step 301, historical shopping data of a user is acquired.

In Step 302, commodity preference information of the user is determined according to the historical shopping data of the user.

Exemplarily, the commodity preference information of the user includes any one or combination of the following parameters: a remaining shelf life preference for a commodity, a food taste preference, a food composition preference and a clothing composition preference.

In Step 303, a barcode of a commodity is scanned to obtain key information of the commodity.

In Step 304, whether the key information of the commodity is matched with the commodity preference information or not is judged, when the key information is matched with the commodity preference information, the flow is ended, and when the key information of the commodity is mismatched with the commodity preference information, Step 305 is performed.

In Step 305, a prompting operation corresponding to the commodity is performed, wherein the prompting operation is configured to prompt the user that the commodity is inconsistent with commodity preference indicated by the commodity preference information.

Exemplarily, the prompting operation corresponding to the commodity at least includes any one or combination of the following operations: controlling an alarm lamp fixed on a shopping cart to flicker for alarming; or, controlling audio play equipment fixed on the shopping cart to output a voice prompt; or, outputting a prompting message on a display panel of the shopping cart, the prompting message being configured to prompt the user that the commodity is inconsistent with commodity preference indicated by the commodity preference information; or, sending an indication message to the terminal of the user, the indication message being configured to prompt the user that the commodity is inconsistent with commodity preference indicated by the commodity preference information; or, controlling a mechanical arm of the shopping cart to move the commodity out of the shopping cart; or, sending a moving-out command to a goods shelf, the moving-out command being configured to indicate the goods shelf to move the commodity out of the shopping cart using a mechanical arm of the goods shelf.

According to the technical solution provided by the embodiment of the present disclosure, the key information of the commodity is analyzed, and when the key information of the commodity is mismatched with the commodity preference information, the user may be automatically prompted that the commodity is inconsistent with commodity preference indicated by the commodity preference information, and the user is not required to manually check the tag of the commodity, so that intelligence in checking of commodity information is achieved, the user may conveniently select the commodity, and a user experience is improved.

The blow is a device embodiment of the present disclosure, which may be configured to perform the method embodiment of the present disclosure.

Figure 4:
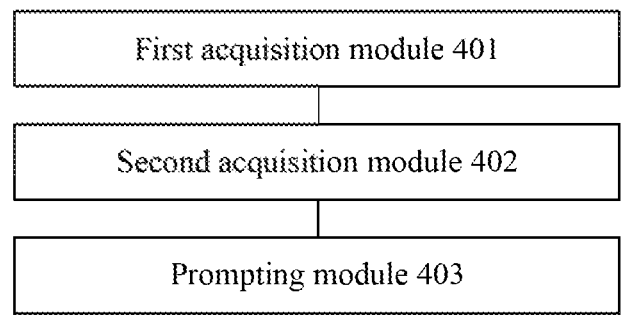
FIG. 4 is a block diagram of a prompting device according to an embodiment of the disclosure.

FIG. 4 is a block diagram of a prompting device (or an electronic device) according to an exemplary embodiment In an example, the prompting device is for a shopping cart. The device may be implemented in various manners. For example, components in the device are implemented on a shopping cart side in a coupling manner. The device may implement a method the present disclosure relates to through software, hardware or a combination of the two. As shown in FIG. 4, the prompting device for a shopping cart includes: a first acquisition module 401 (or a first acquisition apparatus 401), a second acquisition module 402 (or a second acquisition apparatus 402) and a prompting module 403 (or processing circuitry 403), wherein the first acquisition module 401 is configured to acquire commodity preference information (or user preference information) of a user;

the second acquisition module 402 is configured to acquire key information (or product information) of a commodity; and the prompting module 403 is configured to, when the key information of the commodity is mismatched with the commodity preference information, perform a prompting operation corresponding to the commodity, wherein the prompting operation is configured to prompt the user that the commodity is inconsistent with commodity preference indicated by the commodity preference information. In an example, the prompting module 403 is configured to determine whether the key information of the commodity matches the commodity preference information.

The device provided by the embodiment of the present disclosure may be configured to perform the technical solution of the embodiment shown in FIG. 2 and have a similar execution manner and beneficial effects which will not be elaborated herein.

In a possible implementation mode, the second acquisition module 402 scans a barcode of the commodity to obtain the key information of the commodity, for example, using a scanning device; or, the second acquisition module 402 receives the key information of the commodity from a goods shelf, for example, using a receiver; or, the second acquisition module 402 invokes a camera (or a camera device) of a shopping cart to sample a tag of the commodity to obtain a sampled picture, and analyzes the sampled picture to obtain the key information of the commodity. In an example, the prompting device includes the camera.

In a possible implementation mode, the first acquisition module 401 receives the commodity preference information of the user from a terminal of the user, for example, using a receiver; or, the first acquisition module 401 acquires historical shopping data of the user and determine the commodity preference information of the user according to the historical shopping data of the user.

Figure 5:
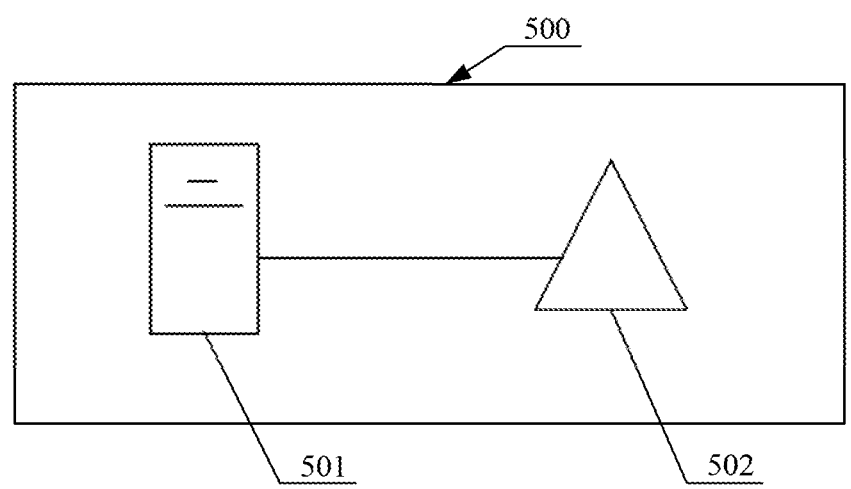
FIG. 5 is a block diagram of a prompting device according to an embodiment of the disclosure.

FIG. 5 is a block diagram of a prompting device 500 according to an exemplary embodiment. In an example, the prompting device 500 is for a shopping cart, and the prompting device 500 is applied to a shopping cart. The prompting device 500 includes:

a processor 501; and a memory 502 configured to store an instruction executable for the processor, wherein the processor 501 is configured to:

acquire commodity preference information of a user;

acquire key information of a commodity; and when the key information of the commodity is mismatched with the commodity preference information, perform a prompting operation corresponding to the commodity, wherein the prompting operation is configured to prompt the user that the commodity is inconsistent with commodity preference indicated by the commodity preference information.

In an embodiment, the processor 501 may further be configured to:

scan a barcode of the commodity to obtain the key information of the commodity; or, receive the key information of the commodity from a goods shelf; or, sample a tag of the commodity to obtain a sampled picture and analyze the sampled picture to obtain the key information of the commodity.

Exemplarily, the prompting operation corresponding to the commodity at least includes any one or combination of the following operations when the prompting device 500 is for a shopping, cart:

controlling an alarm lamp fixed on the shopping cart to flicker for alarming; or, controlling audio play equipment fixed on the shopping cart to output a voice prompt; or, outputting a prompting message on a display panel of the shopping cart, the prompting message being configured to prompt the user that the commodity is inconsistent with commodity preference indicated by the commodity preference information; or, sending an indication message to a terminal of the user, the indication message being configured to prompt the user that the commodity is inconsistent with commodity preference indicated by the commodity preference information; or, controlling a mechanical arm of the shopping cart to move the commodity out of the shopping cart; or, sending a moving-out command to the goods shelf, the moving-out command being configured to indicate the goods shelf to move the commodity out of the shopping cart using a mechanical arm of the goods shelf.

In an embodiment, the processor 501 may further be configured to:

receive the commodity preference information of the user from the terminal of the user; or, acquire historical shopping data of the user and determine the commodity preference information of the user according to the historical shopping data of the user.

Exemplarily, the commodity preference information of the user includes any one or combination of the following parameters: a remaining shelf life preference for a commodity, a food taste preference, a food composition preference and a clothing composition preference.

With respect to the devices in the above embodiments, the specific manners for performing operations for individual modules therein have been described in detail in the embodiments regarding the methods, which will not be elaborated herein.

Figure 6:
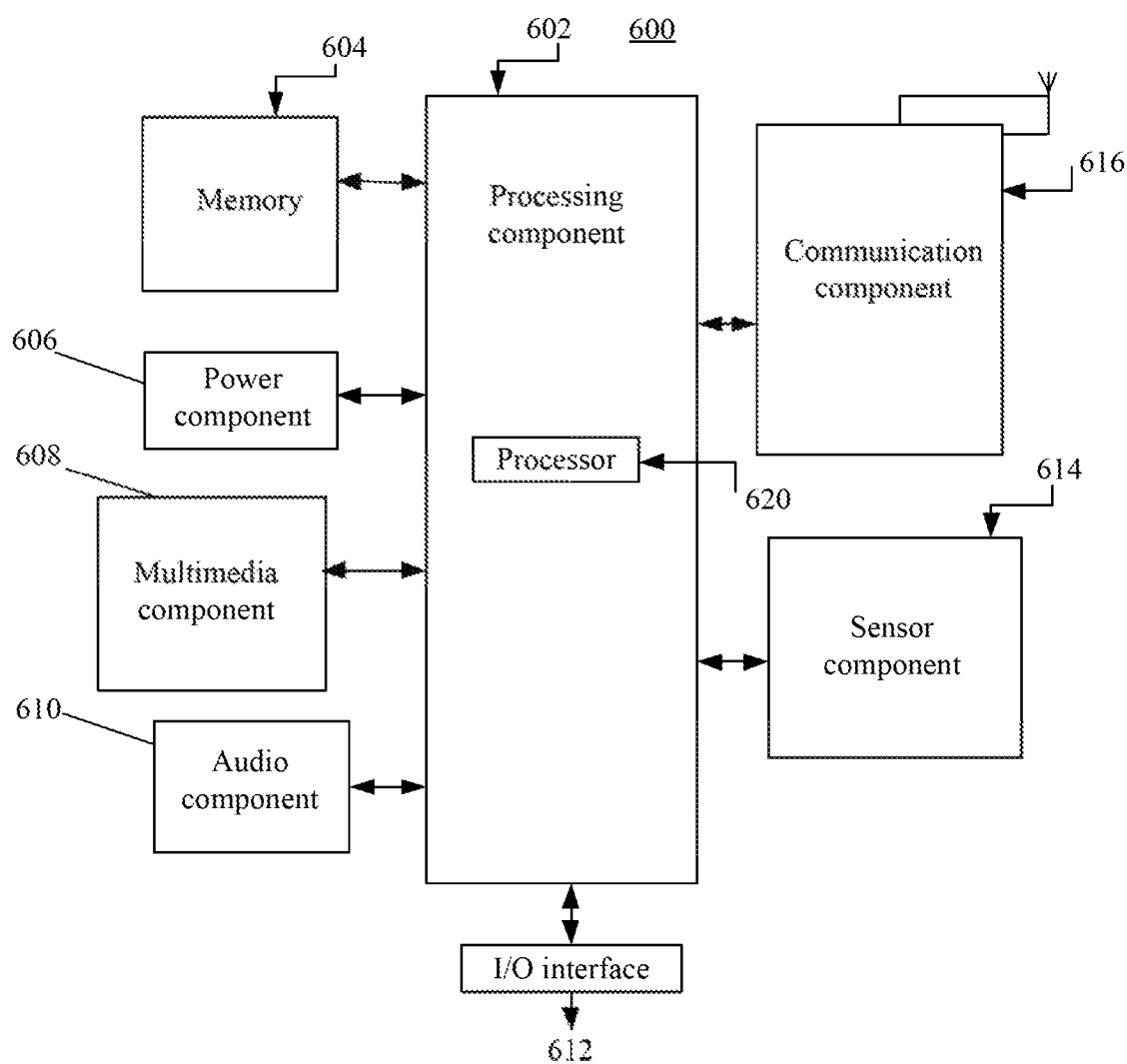
FIG. 6 is a block diagram of a device according to an embodiment of the disclosure.

FIG. 6 is a block diagram of a device, according to an exemplary embodiment. For example, the device 600 may be a mobile phone, a computer, a digital broadcast terminal, a messaging device, gaming console, a tablet, a medical device, exercise equipment, a personal digital assistant, a shopping cart and the like.

Referring to FIG. 6 the device 600 may include one or more of the following components: a processing component 602, a memory 604, a power component 606, a multimedia component 608 an audio component 610, an Input/Output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to perform all or part of the steps in the above mentioned method. Moreover, the processing component 602 may include one or more modules which facilitate interaction between the processing component 802 and the other components. For instance, the processing component (602 may include a multimedia module to facilitate interaction between the multimedia component 608 and the processing component 602.

The memory 604 is configured to store various types of data to support the operation of the device 600. Examples of such data include instructions for any application programs or methods operated on the device 600, contact data, phonebook data, messages, pictures, video, etc. The memory 604 may be implemented by an type of volatile or non-volatile memory devices, or a combination thereof such as a Static Random Access Memory (SRAM), an Electrically Erasable Programmable Read-Only Memory (EEPROM), an Erasable Programmable Read-Only Memory (EPROM), a Programmable Read-Only Memory (PROM) a Read-Only Memory (ROM), a magnetic memory, a flash memory, and a magnetic or optical disk.

The power component 606 provides power for various components of the device 600. The power component 606 may include a power management system, one or more power supplies, and other components associated with the generation, management and distribution of power for the device 600.

The multimedia component 608 includes a screen providing an output interface between the device 600 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a duration and pressure associated with the touch or swipe action. In some embodiments, the multimedia component 608 includes a front camera and/or a rear camera. The front camera and/or the rear camera may receive external multimedia data when the device 600 is in an operation mode, such as a photographing mode or a video mode. Each of the front camera and the rear camera may be a fixed optical lens system or have focusing and optical zooming capabilities.

The audio component 610 is configured to output and/or input an audio signal. For example, the audio component 610 includes a Microphone (MIC), and the MIC is configured to receive an external audio signal when the device 600 is in the operation mode, such as a call mode, a recording mode and a voice recognition mode. The received audio signal may be further stored in the memory 604 or sent through the communication component 616. In some embodiments, the audio component 610 further includes a speaker configured to output the audio signal.

The I/O interface 612 provides an interface between the processing component 602 and a peripheral interface module, and the peripheral interface module may be a keyboard, a click wheel, a button and the like. The button may include, but not limited to: a home button, a volume button, a starting button and a locking button.

The sensor component 614 includes one or more sensors configured to provide status assessment in various aspects for the device 600. For instance, the sensor component 614 may detect an on/off status of the device 600 and relative positioning of components, such as a display and small keyboard of the device 600, and the sensor component 614 may further detect a change in a position of the device 600 or a component of the device 600, presence or absence of contact between the user and the device 600, orientation or acceleration/deceleration of the device 600 and a change in temperature of the device 600. The sensor component 614 may include a proximity sensor configured to detect presence of an object nearby without any physical contact. The sensor component 614 may also include a light sensor, such as a Complementary Metal Oxide Semiconductor (CMOS) or Charge Coupled Device (CCD) image sensor, configured for use in an imaging application. In some embodiments, the sensor component 614 may also include an acceleration sensor, a gyroscope sensor, a magnetic sensor, a pressure sensor or a temperature sensor.

The communication component 616 is configured to facilitate wired or wireless communication between the device 600 and other equipment. The device 600 may access a communication-standard-based wireless network, such as a Wireless Fidelity (WiFi) network, a 2nd-Generation (2G) or 3rd-Generation (3G) network or a combination thereof. In an exemplary embodiment, the communication component 616 receives a broadcast signal or broadcast associated information from an external broadcast management system through broadcast channel. In an exemplary embodiment, the communication component 616 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a Bluetooth (BT) technology and another technology.

In an exemplary embodiment, the device 600 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to perform the abovementioned method.

In an exemplary embodiment, there is also provided a non-transitory computer-readable storage medium including an instruction, such as the memory 604 including an instruction, and the instruction may be executed by the processor 620 of the device 600 to implement the abovementioned method. For example, the non-transitory computer-readable storage medium may be a ROM, a Random Access Memory (RAM), a Compact Disc Read-Only Memory (CD-ROM), a magnetic tape, a floppy disc, optical data storage equipment and the like.

Figure 7:
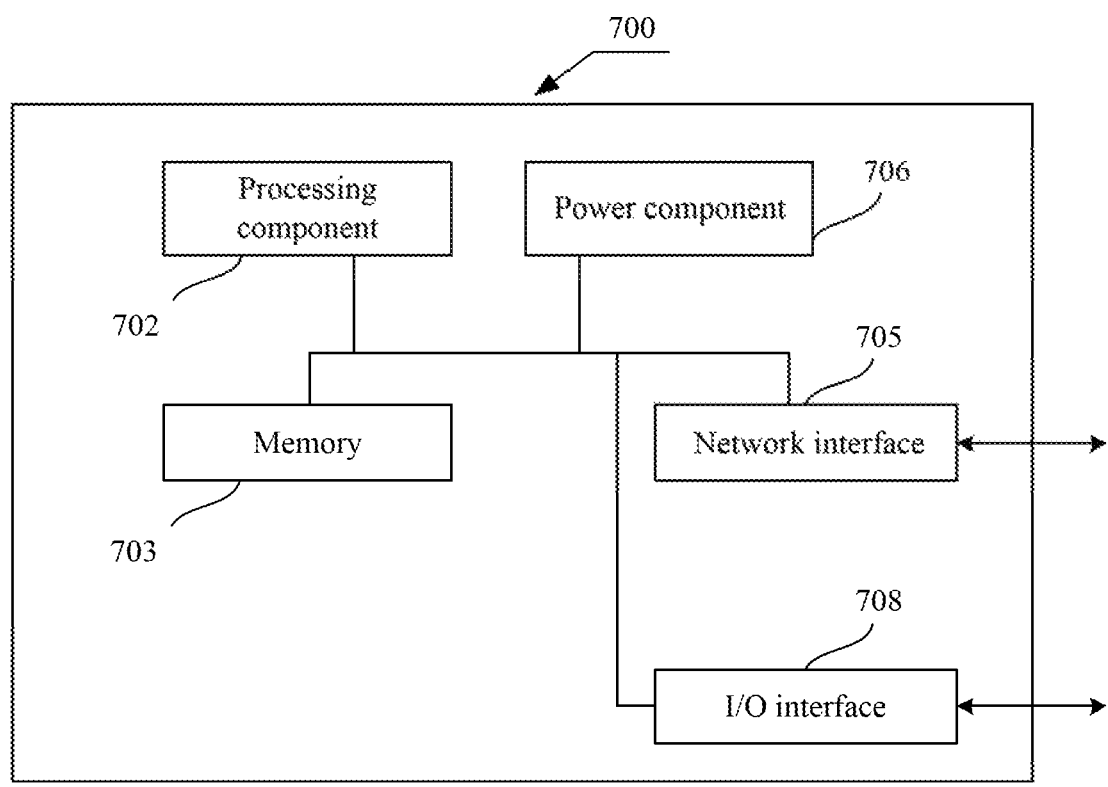
FIG. 7 is a block diagram of a device according to an embodiment of the disclosure.

FIG. 7 is a block diagram of a device, according to an exemplary embodiment. For example, the device 700 may be provided as a server. The device 708 includes a positioning component 702, which further includes one or more processors, and a memory resource represented by a memory 703, which is configured to store instructions executable for the processing component 702, for example, application programs. The application programs stored in the memory 703 may include one or more than one module of which each corresponds to a set of instructions. In addition, the processing component 702 is configured to execute the instructions to execute the above method.

The device 700 may further include a power component 706 configured to execute power management of the device 700, a wired or wireless network interface 705 configured to connect the device 700 to a network, and an I/O interface 707. The device 700 may be operated on the basis of an operating system stored in the memory 703, for example, Windows Server™, Mac OS X™, Unix™, Linux™ or FreeBSD™.

A non-transitory computer-readable storage medium is provided having stored thereon instructions that, when executed by the processor of the device 600 or the device 700, enable the device 600 or the device 700 to execute the following prompting method, the method includes that:

commodity preference information of a user is acquired;
key information of a commodity is acquired; and
when the key information of the commodity is mismatched with the commodity preference information, a prompting operation corresponding to the commodity is performed, wherein the prompting operation is configured to prompt the user that the commodity is inconsistent with commodity preference indicated by the commodity preference information.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A shopping cart, comprising:
    a first acquisition apparatus configured to obtain user preference information associated with a user of the shopping cart;
    a second acquisition apparatus configured to acquire product information of a commercial product;
    processing circuitry configured to determine whether the product information matches the user preference information, and when the product information fails to match the user preference information, perform a prompting operation corresponding to the commercial product to prompt the user that the product information fails to match the user preference information; and
    a mechanical frame including a storage area;
    wherein the processing circuitry is configured to perform the prompting operation corresponding to the commercial product when the product information fails to match the user preference information by at least one of:
        controlling a light source attached to the mechanical frame to produce light flashes; or
        controlling an audio equipment attached to the mechanical frame to output an audio warning message, and
    wherein the processing circuitry is further configured to send a command to a shelf, instructing the shelf to move the commercial product out of the storage area using a mechanical arm attached to the shelf when the product information fails to match the user preference information.

2. The shopping cart according to claim 1, wherein
    the first acquisition apparatus, the second acquisition apparatus, and the processing circuitry are attached to the mechanical frame; and
    the processing circuitry is configured to obtain the user preference information and the product information from the first acquisition apparatus and the second acquisition apparatus, respectively.

3. The shopping cart according to claim 1, wherein the second acquisition apparatus comprises at least one of:
    a scanning device configured to scan a barcode of the commercial product to obtain the product information;
    a receiver configured to receive the product information transmitted from a shelf storing the commercial product; and
    a camera device configured to sample a tag of the commercial product to obtain a sampled picture, and analyze the sampled picture to obtain the product information.

4. The shopping cart according to claim 1, wherein,
    the product information fails to match the user preference information;
    the commercial product is located in the storage area of the mechanical frame; and
    the processing circuitry is configured to control the mechanical arm attached to the mechanical frame to move the commercial product out of the storage area.

5. The shopping cart according to claim 1, wherein the first acquisition apparatus comprises a receiver configured to receive, from a terminal device of the user, the user preference information.

6. The shopping cart according to claim 1, wherein the first acquisition apparatus is further configured to:
    acquire historical shopping data associated with the user; and
    determine the user preference information according to the historical shopping data.

7. The shopping cart according to claim 1, wherein the user preference information includes whether or not to have a particular: food ingredient, food flavor, drug ingredient, and fabric content.

8. The shopping cart according to claim 1, wherein the user preference information includes a remaining shelf life.

9. The shopping cart according to claim 1, wherein the product information comprises at least one of: a parameter indicating a remaining shelf life, one or more food ingredients, one or more food flavors, one or more drug ingredients, and one or more fabric contents.

10. A method, comprising:
    obtaining, by an electronic device, user preference information associated with a user of the electronic device;
    acquiring, by the electronic device, product information of a commercial product;
    determining, by the electronic device, whether the product information matches the user preference information; and
    when the product information fails to match the user preference information, performing, by the electronic device, a prompting operation corresponding to the commercial product to prompt the user that the product information fails to match the user preference information;
    wherein a shopping cart includes the electronic device and performing the prompting operation includes at least one of:
        controlling a light source attached to the shopping cart to produce light flashes; or controlling an audio equipment attached to the shopping cart to output an audio warning message, and wherein the electronic device is further configured to send a command to a shelf, instructing the shelf to move the commercial product out of a storage area using a mechanical arm attached to the shelf when the product information fails to match the user preference information.

11. The method according to claim 10, wherein acquiring the product information comprises at least one of:

scanning, by a scanning device of the electronic device, a barcode of the commercial product to obtain the product information;

receiving, by a receiver of the electronic device, the product information transmitted from a shelf storing the commercial product;

sampling, by a camera device of the electronic device, a tag of the commercial product to obtain a sampled picture; and analyzing, by the camera device, the sampled picture to obtain the product information.

12. The method according to claim 10, wherein the shopping cart includes the electronic device and performing the prompting operation includes controlling the mechanical arm attached to the shopping cart to move the commercial product out of the shopping cart.

13. The method according to claim 10, wherein obtaining the user preference information further comprises:

receiving, by a receiver in the electronic device, the user preference information from a terminal device of the user; or acquiring historical shopping data associated with the user, and determining the user preference information according to the historical shopping data.

14. The method according to claim 10, wherein the user preference information includes whether or not to have a particular: food ingredient, food flavor, drug ingredient, and fabric content.

15. The method according to claim 10, wherein the user preference information includes a remaining shelf life.

16. An electronic device, comprising:

a first acquisition apparatus configured to obtain user preference information associated with a user of the electronic device;

a second acquisition apparatus configured to acquire product information of a commercial product; and processing circuitry configured to determine whether the product information matches the user preference information, and perform a prompting operation corresponding to the commercial product to prompt the user that the commercial product fails to match the user preference information when the product information fails to match the user preference information;

wherein the processing circuitry is configured to perform the prompting operation corresponding to the commercial product when the product information fails to match the user preference information by at least one of:

controlling a light source attached to a mechanical frame to produce light flashes; or controlling an audio equipment attached to the mechanical frame to output an audio warning message, and wherein the processing circuitry is further configured to send a command to a shelf, instructing the shelf to move the commercial product out of a storage area using a mechanical arm attached to the shelf when the product information fails to match the user preference information.

17. The electronic device according to claim 16, wherein the second acquisition apparatus comprises at least one of:

a scanning device configured to scan a barcode of the commercial product to obtain the product information;

a receiver configured to receive the product information transmitted from a shelf storing the commercial product; and a camera device configured to sample a tag of the commercial product to obtain a sampled picture, and analyze the sampled picture to obtain the product information.

18. The electronic device according to claim 16, wherein the first acquisition apparatus is configured to:

acquire historical shopping data associated with the user; and determine the user preference information according to the historical shopping data.

* * * * *